(12) United States Patent
Swane et al.

(10) Patent No.: US 7,645,204 B2
(45) Date of Patent: Jan. 12, 2010

(54) PULLEY ASSEMBLY FOR MAINTAINING CONSTANT POSITION OF A BEARING OUTER RACE RELATIVE TO A PULLEY, AND METHOD

(75) Inventors: Jeffrey A. Swane, Nixa, MO (US); Daniel A. Pelton, Springfield, MO (US)

(73) Assignee: Dayco Products, LLC, Miamisburg, OH (US)

( * ) Notice: Subject to any disclaimer, the term of this patent is extended or adjusted under 35 U.S.C. 154(b) by 469 days.

(21) Appl. No.: 11/238,212

(22) Filed: Sep. 28, 2005

(65) Prior Publication Data

US 2007/0072716 A1    Mar. 29, 2007

(51) Int. Cl.
    *F16H 55/06*    (2006.01)
(52) U.S. Cl. .................... 474/161; 384/417
(58) Field of Classification Search .......... 474/161, 474/192, 199; 384/296, 449, 546, 547, 587, 384/588; 492/31
    See application file for complete search history.

(56) References Cited

U.S. PATENT DOCUMENTS

| | | | | |
|---|---|---|---|---|
| 1,802,003 | A | * | 4/1931 | Connelly ................ 101/401.1 |
| 3,061,888 | A | * | 11/1962 | Wadham .................... 264/437 |
| 3,788,155 | A | * | 1/1974 | Cigala et al. ................ 474/177 |
| 3,789,683 | A | | 2/1974 | Frost et al. |
| 4,265,133 | A | | 5/1981 | Van Der Meulen et al. |
| 4,366,609 | A | * | 1/1983 | Speer .................... 29/892.3 |
| 4,468,210 | A | | 8/1984 | McCutchan, Jr. |
| 4,473,363 | A | | 9/1984 | McCutchan, Jr. |
| 4,518,372 | A | | 5/1985 | Dye |
| 4,822,111 | A | * | 4/1989 | Albert .................... 301/64.303 |
| 4,913,688 | A | | 4/1990 | Bekheet |
| 5,083,983 | A | | 1/1992 | Hirai et al. |
| 5,176,580 | A | | 1/1993 | Stamm et al. |
| 5,195,241 | A | | 3/1993 | Bradfield |
| 5,476,423 | A | | 12/1995 | Meyer |
| 5,660,447 | A | * | 8/1997 | Angelici ................... 301/5.7 |
| 5,676,202 | A | | 10/1997 | Akashi et al. |
| 5,724,930 | A | | 3/1998 | Sakurai et al. |
| 5,725,448 | A | | 3/1998 | Kato et al. |
| 5,751,519 | A | | 5/1998 | Hata |

(Continued)

FOREIGN PATENT DOCUMENTS

JP    60025713 A    *    2/1985

*Primary Examiner*—Robert A Siconolfi
*Assistant Examiner*—Stephen Bowes
(74) *Attorney, Agent, or Firm*—Thompson Hine LLP; Joseph V. Tassone

(57) ABSTRACT

A method for maintaining constant position of a bearing outer race relative to an axial bore of a pulley comprising providing a pulley having a central axial hub exhibiting a concentric axial bore therethrough, the concentric axial bore having an axial bore surface; providing a bearing having an outer axial race, an inner axial race, and a plurality of bearing elements rotatably positioned between the outer axial race and the inner axial race; applying at least one drop or bead of a fastening element onto an outer surface of the outer race, wherein the fastening element acts to maintain constant position of the bearing relative to the pulley; and coupling the bearing to the pulley, and a pulley having a bearing integral therewith which exhibit the characteristic of maintaining constant position of the bearing relative to the pulley are disclosed.

17 Claims, 2 Drawing Sheets

U.S. PATENT DOCUMENTS

| | | |
|---|---|---|
| 5,782,709 A | 7/1998 | Greimann |
| 5,830,046 A | 11/1998 | Dugger et al. |
| 5,871,286 A * | 2/1999 | Kern et al. .................. 384/280 |
| 6,019,693 A | 2/2000 | Ban et al. |
| 6,032,635 A | 3/2000 | Moorman et al. |
| 6,086,809 A | 7/2000 | Goto et al. |
| 6,090,001 A | 7/2000 | Cantwell |
| 6,102,822 A | 8/2000 | Nakazeki |
| 6,120,401 A | 9/2000 | Taniguchi et al. |
| 6,181,239 B1 | 1/2001 | Ahmed |
| 6,200,513 B1 | 3/2001 | Emmett |
| 6,220,635 B1 | 4/2001 | Vitel et al. |
| 6,247,555 B1 * | 6/2001 | Millard ...................... 184/15.1 |
| 6,432,343 B1 * | 8/2002 | Zollondz et al. ............ 264/255 |
| 6,482,140 B1 * | 11/2002 | Takatsu ....................... 492/31 |
| 6,705,762 B2 * | 3/2004 | Pilone et al. ................. 384/544 |
| 6,715,925 B2 | 4/2004 | Pairone et al. |
| 6,869,151 B2 | 3/2005 | Myers et al. |
| 7,297,081 B2 * | 11/2007 | Eck ............................. 474/161 |

* cited by examiner

PULLEY ASSEMBLY FOR MAINTAINING CONSTANT POSITION OF A BEARING OUTER RACE RELATIVE TO A PULLEY, AND METHOD

BACKGROUND OF THE INVENTION

The present invention relates to the field of pulleys. In particular, the invention relates to plastic pulleys with an insert molded bearing assembly comprising an outer race, an inner race, and a plurality of roller bearings seated between the outer and inner races. More particularly, the pulleys of the invention are adapted to have resistance to rotation of the axial bearing relative to the pulley. The present invention also relates to a method for manufacturing such pulleys. In the present invention, the terms "bearing," "metal bearing," "metal rolling bearing," and "integral bearing" are interchangeable; and the terms "insert," "rigid insert," "bearing insert," and "metal tubular insert" are interchangeable.

Plastic pulleys are known in the art as taught by U.S. Pat. Nos. 6,220,635; 6,200,513; 6,181,239; 6,120,401; 6,102,822; 6,090,001; 6,086,809; 6,032,635; 5,830,046; 5,782,709; 5,725,448; 5,724,930 and 5,176,580. Such plastic pulleys have heretofore been made by either molding-in a bearing, incorporated as an insert in the molding process, or by force fitting a bearing into a molded bore in the plastic part. For example, U.S. Pat. Nos. 4,468,210 and 4,473,363 describe examples of a plastic outer pulley body molded on a metal disc; and U.S. Pat. Nos. 4,913,688 and 5,476,423 describe examples of a two-step assembly wherein first a plastic outer pulley body is molded and then the metal insert is placed into the already molded pulley body.

Traditionally, when a pulley produced by the one-step process of injection molding the plastic pulley body about the metal bearing, the bearing can be physically altered to include one or more projections such as radially extending scallops or knurls on the outer periphery of the bearing.

Pulleys are also produced by the two-step process wherein a metal bearing is attached to a molded plastic outer pulley by forcing the bearing into the bore of the pulley. An adhesive is generally applied between the outer metal surface of the insert and the inner surface of the plastic pulley body to assist in bonding the bearing to the pulley body. In each of the methods, the bearing retention is less than desirable since the clamping force, which secures the bearing, is dependent upon the modulus of the plastic material and upon the surface of the outer bearing race. Typically, the outer bearing is smooth and made from material having relatively little affinity for the plastic pulley. Furthermore, asymmetric forces, which may occur during the molding process or during use, can distort the bearing to an out-of-round condition, thereby, shortening its useful life. For example, when a pulley is subjected to a heavy radial load from a belt, such as a v-ribbed belt, entrained therearound, the pulley and the bearing are slightly deformed and, since the deformation patterns of the plastic pulley and the insert are different, a slight clearance is defined between the inner surface of the pulley and the outer surface of the bearing. This clearance becomes wider as the radial force from the belt increases and over time, results in the wear of the fit surfaces of the pulley and the outer surface of the bearing, thus decreasing the joining force between the pulley and the bearing.

U.S. Pat. No. 4,822,111 to Albert teaches a two-part wheel assembly, such as used for wheelbarrows, wherein the two parts are joined together and a plain type anti-frictional bearing, usually molded plastic such as nylon, modified with a material, which provides good thermal, mechanical and bearing properties.

All journal bearings, e.g., engine main bearings and connecting rod bearings, incorporate some type of anti-rotation device, usually in the form of an outwardly-deflected tab which mates with a relief in the bearing cavity. It is also generally known to knurl or otherwise physically texture the outer surface of the outer race of a rolling-element bearing to be molded or captured in a bearing cavity. Also, it is generally known to glue the outer race of the bearing into its cavity, either directly in the part or in a separate shell insert. The use of a separate shell insert is disclosed in copending commonly assigned U.S. patent application Ser. No. 10/654,567, filed Aug. 29, 2003, the contents of which are incorporated herein by reference thereto. However, the process of bonding the bearing assembly and/or an insert to the pulley with an adhesive or glue presents undesirable clean-up and environmental problems generated by the large amounts of adhesive or glue employed. Accordingly, there is a need, particularly in the area of an endless drive belt of a vehicle accessories drive system, for a plastic pulley with a metal bearing that may be easily manufactured without the problems associated with prior art pulleys.

SUMMARY OF THE INVENTION

In accordance with the present invention, a pulley assembly is modified by strategically placing at least one drop or bead of a fastening element such as a polymeric cement or rigid material on the outer surface of the outer race of the bearing therein to maintain bearing position relative to the pulley. Preferably, the invention relates to an over-molded pulley assembly in which the pulley is molded over the bearing outer race to provide a pulley-integral bearing assembly. In an optional aspect of the invention, a separate insert may be placed between the surface of the axial bore of the pulley and the bearing outer race. In this optional aspect of the invention, the fastening element may be placed between the outer surface of the outer race of the bearing and the inner surface of the insert, and/or between the outer surface of the insert and the surface of the axial bore in the pulley. Typically, the roller bearing is fitted into the injection mold before molding.

Several fastening element means for preventing rotation of the outer race of the bearing with respect to the pulley are disclosed herein.

In one aspect of the invention, one or more drops or beads of cement are placed on the outer surface of the outer race of a bearing before molding into the pulley.

In another aspect of the invention, one or more pieces of a rigid material such as a metal, ceramic or plastic are cemented onto the outer surface of the outer race of a bearing in place of only cement.

In yet another aspect of the invention, one or more beads of a metal may be welded onto the outer surface of the outer race of a bearing prior to assembly with the pulley.

In still another aspect of the invention, a primer is applied to the outer surface of the outer race of the bearing to improve the adherence of the cement or rigid material.

Preferably, the bearing is insert molded into the pulley body, such that the bearing is integrally captured in the pulley body.

In applications where a rigid insert is employed, the rigid insert is fitted into the axial bore of the pulley between the surface of the axial bore and the barrier outer race.

A method for manufacturing the pulley of the present invention wherein the bearing outer race is prevented from undesirable rotation with respect to the pulley, is also disclosed.

DETAILED DESCRIPTION OF THE INVENTION

Figure 1:
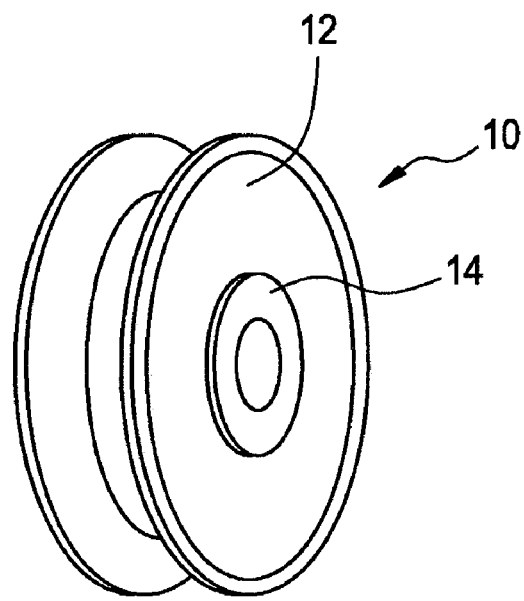
FIG. 1 is a perspective view of a pulley of the present invention having a bearing outer race axially formed therein.
Figure 2:
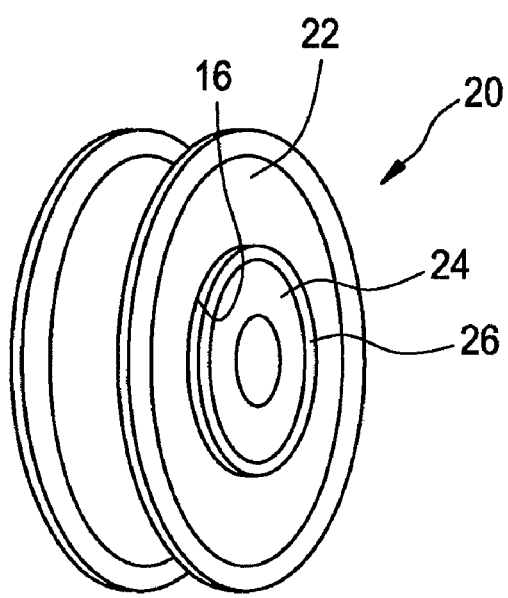
FIG. 2 is a perspective view of a pulley of the present invention having an insert axially formed between the surface of the axial bore of the pulley and the outer race of the bearing.

Referring to the drawings, FIG. 1 illustrates a pulley 10 comprising a molded pulley body 12 having an integral bearing 14 centrally positioned in the molded pulley body 12. FIG. 2 illustrates a pulley 20 comprising a molded pulley body 22 having an integral bearing 24 centrally positioned in the molded pulley body 22.

In FIG. 2, the pulley 10 further includes a tubular bearing insert 26 incorporated in the axial bore 16 of the pulley between the molded pulley body 22 and the outer bearing race. The integral bearing 24 may be fitted into the bearing insert 26 either before or after molding.

Figure 3:
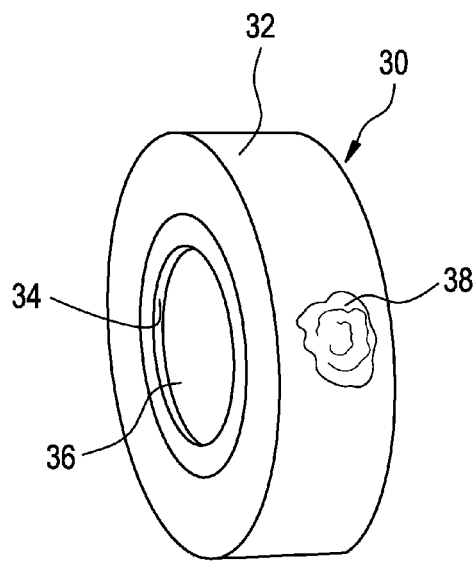
FIG. 3 is a perspective view of a bearing illustrating one aspect of the invention in accordance with a first embodiment of the present invention.

Referring now to FIG. 3, a bearing 30 comprises an outer race 32, an inner race 34 an axial bore 36 concentrically positioned in the bearing 30. One or more drops or beads of an appropriate cement 38 is placed on the outer surface of the outer race 32 of the bearing 30 to maintain a constant position of the bearing 30 relative to the pulley.

Figure 4:
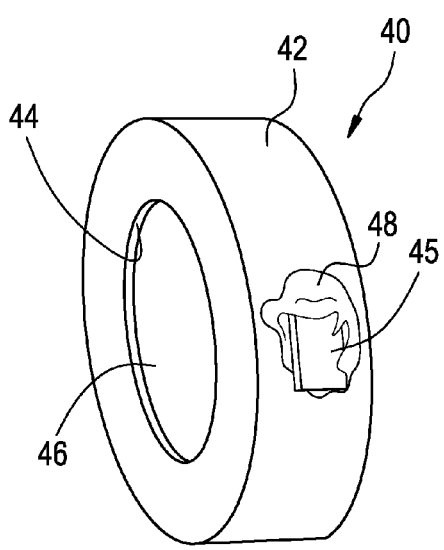
FIG. 4 is a perspective view of a bearing illustrating another aspect of the invention in accordance with a first embodiment of the present invention.

Referring now to FIG. 4, a bearing 40 comprises an outer race 42, an inner race 44 an axial bore 46 concentrically positioned in the bearing 40. A rigid fragment 45 is adhered to the outer surface of the outer race 42 by an appropriate cement 48 to maintain a constant position of the bearing 40 relative to the pulley.

Figure 5:
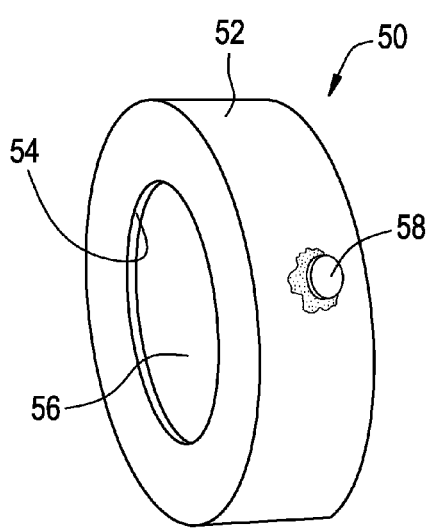
FIG. 5 is a perspective view of a bearing illustrating yet another aspect in accordance with a first embodiment of the present invention.
Figure 6:
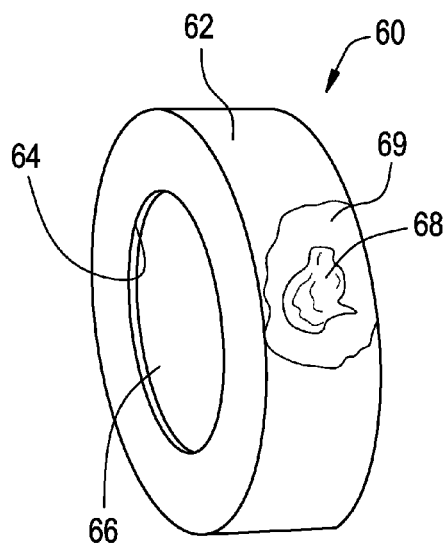
FIG. 6 is a perspective view of a bearing illustrating still another aspect of the invention in accordance with a first embodiment of the present invention.

Referring now to FIG. 5, a bearing 50 comprises an outer race 52, an inner race 54 an axial bore 56 concentrically positioned in the bearing 50. A metal fragment 58 is welded onto the outer surface of the outer race 52 to maintain a constant position of the bearing 50 relative to the pulley. The weld drop could become the fragment and would not require a metal fragment. Referring now to FIG. 6, a bearing 60 comprises an outer race 62, an inner race 64 an axial bore 66 concentrically positioned in the bearing 60. A primer 69 is applied to at least a portion of the outer surface of the outer race 62 to enhance the adhesion of the fastening element 68 thereto. The fastening element 68 is placed on the outer surface of the outer race 62 to maintain a constant position of the bearing 60 relative to the pulley.

The adhesive material used in carrying out the present invention is an appropriate adhesive material which effectuates the desired effects of maintaining the bearing at a constant position relative to the pulley during operation at conventional hub loads. Typically, the adhesive is a polymeric material selected from the group consisting of epoxies, urethanes, acrylics, acrylates, methacrylates, cyanoacrylates, silicone, phenolic, and blends thereof. Preferably, the adhesive is methacrylate.

The rigid material employed as a fastening element in the present invention is a metal, ceramic or plastic material in the form of a dot or small fragment. Typically, the rigid material is selected from the group consisting of ferrous or non ferrous metals, ceramics, rigid plastics, and synthetic fibers. Preferably, the rigid material is ferrous metal.

The primer employed to further enhance the strength of the bond between the adhesive material and the outer surface of the outer race of the bearing is an organic substrate selected from the group consisting of phenolic, epoxy, acrylic, and urethane. Preferably, the primer is phenolic based.

The pulley of the present invention may be formed from a wide variety of polymeric materials, provided that they are distortion resistant at ambient and higher temperatures. It also is generally desirable, particularly for automotive applications, that the polymeric material used to make the pulley has a low-temperature resiliency. Suitable polymeric materials include thermoplastic and thermosetting materials, such as polyamides, e.g., nylons, particularly, nylon-6, nylon-6,6, nylon and nylon 4,6; polyphthalamides; polyesters, epoxy resins; phenolic resins; polyurethanes; high density polyolefins and ultra high density polyolefins, e.g., high density polyethylene (HDPE) and ultra high density polyethylene (UHDPE); and the like. The polymeric material used to manufacture the body of the pulley may be compounded with additional fillers, modifiers or reinforcing agents as determined for a particular application. In a preferred aspect of the invention the polymeric material contains a reinforcing material, such as a fibrous glass reinforcing material.

Typically, the outer peripheral surfaces of the pulley comprise a plurality of protrusions and recesses. The protrusions may be in the form of V-shaped projections and recesses or truncated V-shaped projections and recesses. Any other useful pulley design including flat pulleys, grooved pulleys and timing pulleys are also useful in carrying out the present invention.

The tubular bearing insert 26 shown in FIG. 2 may be manufactured from steel, aluminum, zinc, brass, or any other suitably rigid and strong material including ceramic materials. At least one drop or bead of a fastening element as described below may also be employed on the outer surface of the bearing insert 26 in order to enhance adhesion to the particular polymeric material selected for the body 22 of the pulley 20. One or more of the fastening elements may also be employed on the bearing 24 to enhance the adhesion between the bearing 24 and the bearing insert 26. Alternatively, the tubular bearing insert 26 may be coated or plated to enhance adhesion of the tubular bearing insert to the pulley. For example, a brass or zinc plating over a steel tubular insert shell increases the chemical affinity of the insert for a thermoplastic phenolic material, especially if the phenolic material also incorporates any of several classes of adhesion-enhancing ingredients, e.g., sulfur or silica. The outer surface of the tubular bearing insert 26 may be knurled, grooved, smooth, splined, or otherwise shaped to provide a rough surface for the purpose of enhancing the mechanical interlock of the insert 24 with the plastic body 12. The inner surface of the tubular insert 26 may be provided with means 24, such as a stepped profile or detents, to accurately locate and align the bearing insert 26 during mating.

Typically, the pulley of the present invention is formed using a three-plate mold of the type generally known in the art. The pulley is made by injecting a suitable polymeric material through injection gate(s) in the three-plate mold under sufficient pressure, e.g., about 500-30,00 psi. to fill the cavity, causing it to conform to the mold.

The following examples are provided to demonstrate the improvement exhibited by the present invention over conventional pulley assemblies.

COMPARATIVE EXAMPLE 1

A pulley assembly having a standard bearing was tested by conventional procedures and found to have a bearing spin start (the tension at which the bearing starts to spin relative to the pulley) at 250 inch pounds torque.

EXAMPLE 1

A pulley assembly similar to that shown in the Comparative Example was modified by applying two drops of Methacrylate adhesive onto the outer surface of the outer race of the bearing prior to assembly with the pulley. The adhesive-modified pulley assembly exhibits a bearing spin start greater than 250 inch pounds torque. While the improvement exhibited by the application of methacrylate onto the outer surface of the outer race of the bearing was real, a significantly greater improvement is obtained by first applying a primer to the surface of the outer race of the bearing prior to placing the methacrylate thereon as shown in the following examples.

COMPARATIVE EXAMPLE 2

A pulley assembly having a standard bearing was determined, by conventional testing procedures, to exhibit bearing spin almost immediately upon being subjected to a torque of 250 inch pounds.

EXAMPLE 2

An identical pulley assembly was modified by applying phenolic primer to the outer surface of the outer race of the bearing, and then placing a drop of methacrylate adhesive onto the outer surface of the primer. The pulley, thusly modified, ran over 8 hours without exhibiting any bearing spin.

COMPARATIVE EXAMPLE 3

A second pulley assembly was determined to exhibit the same immediate bearing spin as that of the pulley assembly of comparative example 2 when subjected to a torque of 425 inch pounds.

EXAMPLE 3

The second pulley assembly was modified similarly to the pulley assembly of Example 2. The second modified pulley assembly ran for more than 8 hours without exhibiting any bearing spin, confirming the results of Example 2.

Various changes and modifications may be made to the pulley having an integral bearing of the present invention, and to a method for maintaining the outer bearing race in constant position relative to the pulley. Therefore, while several embodiments, including a preferred embodiment have been described and illustrated, the invention should not be limited thereto, but other embodiments and aspects may be included without departing from the scope and spirit of the appended claims.

What is claimed is:

1. A method for improving resistance to bearing spin in a pulley assembly, said pulley assembly comprising a polymeric pulley having an integral bearing concentrically positioned therein, said method comprising:
   providing a polymeric pulley having a central axial hub exhibiting a concentric axial bore therethrough, said concentric axial bore having an axial bore surface;
   providing a metal tubular insert adjacent said axial bore surface, said metal tubular insert having an outer surface and an inner surface, wherein said outer surface of said metal tubular insert is coated with a brass or zinc coating to enhance adhesion of said outer surface of said metal tubular insert to said axial bore surface of said polymeric pulley;
   providing an integral bearing having an outer axial race and an inner axial race, wherein said outer axial race of said integral bearing is coated with a phenolic primer;
   applying at least one drop or bead of a fastening element onto said outer axial race having said phenolic primer coated thereon; and
   forming said pulley assembly wherein said metal tubular insert is fixedly mounted in said axial bore of said polymeric pulley, and said outer axial race of said integral bearing is fixedly mounted to said inner surface of said metal tubular insert, wherein said pulley assembly retains constant position of said integral bearing relative to said polymeric pulley.

2. The method of claim 1, wherein said fastening element is a polymeric cement selected from the group consisting of epoxies, urethanes, acrylics, acrylates, methacrylates, cyanoacrylates, silicone, phenolic, and blends thereof.

3. The method of claim 2 wherein said polymeric cement is a methacrylate.

4. The method of claim 1 wherein said fastening element is a rigid material adhered to the outer surface of said outer axial race by a polymeric cement.

5. The method of claim 4 wherein said rigid material is a metal, ceramic or plastic material selected from the group consisting of ferrous or non-ferrous metals, ceramics, rigid plastics, and synthetic fibers.

6. The method of claim 5, wherein said metal is a ferrous or non-ferrous metal.

7. The method of claim 6 wherein said ferrous or non-ferrous metal is applied by welding.

8. The method of claim 1 wherein said pulley is formed from a polymeric material selected from the group consisting of polyamides, polyphthalamides, polyesters, epoxy resins, phenolic resins, polyurethanes, high density polyolefins, and ultra high density polyolefins.

9. The method of claim 1, wherein forming said pulley assembly includes over-molding said pulley on said metal tubular insert and said bearing.

10. An over molded pulley assembly having improved resistance to bearing spin, said over-molded pulley assembly comprising:
   a polymeric pulley having a central axial hub exhibiting a concentric axial bore therethrough, said concentric axial bore having an axial bore surface;
   a metal tubular insert adjacent said axial bore surface, said metal tubular insert having an outer surface and an inner surface, wherein said outer surface of said metal tubular insert is coated with a brass or zinc coating to enhance adhesion of said outer surface of said metal tubular insert to said axial bore surface of said polymeric pulley, an integral bearing having an outer axial race and an inner axial race, wherein said outer axial race of said integral bearing is coated with a phenolic primer; and at least one drop or bead of a fastening element positioned on an outer surface of said outer axial race having said phenolic primer coated thereon, wherein said pulley assembly retains constant position of said integral bearing relative to said polymeric pulley.

11. The pulley of claim 10, wherein said fastening element is a polymeric cement selected from the group consisting of epoxies, urethanes, acrylics, acrylates, methacrylates, cyanoacrylates, silicone, phenolic, and blends thereof.

12. The pulley of claim 11 wherein said polymeric cement is a methacrylate.

13. The pulley of claim 10 wherein said fastening element is a rigid material adhered to the outer surface of said outer axial race by a polymeric cement.

14. The pulley of claim 13 wherein said rigid material is selected from the group consisting of ferrous or non-ferrous metals, ceramics, rigid plastics, and synthetic fibers.

15. The pulley of claim 14, wherein said metal is a ferrous or non-ferrous metal.

16. The pulley of claim 10 wherein said pulley is formed from a polymeric material selected from the group consisting of polyamides, polyphthalamides, polyesters, epoxy resins, phenolic resins, polyurethanes, and high density polyolefins, and ultra high density polyolefins.

17. In a pulley assembly adapted for use with an endless drive belt in a vehicle, wherein said pulley assembly comprises a polymeric pulley, said polymeric pulley having a central axial hub exhibiting a concentric axial bore therethrough, said concentric axial bore having an axial bore surface; and an integral bearing having an outer axial race and an inner axial race, the improvement wherein said pulley assembly further comprises a metal tubular insert between said polymeric pulley and said integral bearing, said metal tubular insert having an outer surface and an inner surface wherein said outer surface of said metal tubular insert is adjacent said axial bore surface of said polymeric pulley and said inner surface of said metal tubular insert is adjacent said outer axial race of said integral bearing, wherein said outer surface of said metal tubular insert is coated with a brass or zinc coating to enhance adhesion of said outer surface of said metal tubular insert to said axial bore surface of said polymeric pulley; and wherein said integral bearing has at least one drop or bead of a fastening element on said outer axial race, wherein said fastening element is a polymeric cement selected from the group consisting of epoxies, urethanes, acrylics, acrylates, methacrylates, cyanoacrylates, silicone, phenolic, and blends thereof; wherein said outer race of said integral bearing further includes a primer between said outer race of said integral bearing and said at least one drop or bead of fastening element, said pulley assembly exhibiting improved resistance to bearing spin by retaining constant position of said integral bearing relative to said polymeric pulley.

* * * * *

UNITED STATES PATENT AND TRADEMARK OFFICE
CERTIFICATE OF CORRECTION

PATENT NO. : 7,645,204 B2
APPLICATION NO. : 11/238212
DATED : January 12, 2010
INVENTOR(S) : Swane et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 940 days.

Signed and Sealed this

Twenty-first Day of December, 2010

David J. Kappos
*Director of the United States Patent and Trademark Office*